United States Patent [19]
Chheda et al.

[11] Patent Number: 6,038,448
[45] Date of Patent: Mar. 14, 2000

[54] WIRELESS COMMUNICATION SYSTEM HAVING HAND-OFF BASED UPON RELATIVE PILOT SIGNAL STRENGTHS

[75] Inventors: Ashvin H. Chheda, Dallas; Ahmad Jalali, Plano, both of Tex.

[73] Assignee: Nortel Networks Corporation, Montreal, Canada

[21] Appl. No.: 08/899,105

[22] Filed: Jul. 23, 1997

[51] Int. Cl.[7] .................................................. H04B 7/20
[52] U.S. Cl. ......................... 455/436; 455/442; 370/332
[58] Field of Search ................................. 370/331, 332, 370/335, 342, 491, 252; 375/200; 455/442, 436, 437, 439, 438, 525, 444

[56] References Cited

U.S. PATENT DOCUMENTS

| | | | |
|---|---|---|---|
| 5,175,867 | 12/1992 | Wejke et al. ............................. | 455/439 |
| 5,267,261 | 11/1993 | Blakeney, II et al. .................. | 370/332 |
| 5,432,843 | 7/1995 | Bonta ...................................... | 455/436 |
| 5,454,026 | 9/1995 | Tanaka .................................... | 455/437 |
| 5,455,963 | 10/1995 | Shiotsuki et al. ....................... | 455/439 |
| 5,483,669 | 1/1996 | Barnett et al. ........................... | 455/437 |
| 5,491,837 | 2/1996 | Haartsen ................................. | 455/62 |
| 5,499,386 | 3/1996 | Karlsson ................................. | 455/444 |
| 5,517,674 | 5/1996 | Rune ....................................... | 455/437 |
| 5,548,808 | 8/1996 | Bruckert et al. ........................ | 455/442 |
| 5,623,484 | 4/1997 | Muszynski .............................. | 370/335 |
| 5,625,876 | 4/1997 | Gilhousen et al. ..................... | 370/331 |
| 5,640,414 | 6/1997 | Blakeney, II et al. .................. | 375/200 |
| 5,673,307 | 9/1997 | Holland et al. ......................... | 455/436 |
| 5,722,073 | 2/1998 | Wallstedt et al. . | |
| 5,732,347 | 3/1998 | Bartle et al. ............................ | 455/421 |
| 5,794,149 | 8/1998 | Hoo ......................................... | 455/438 |
| 5,848,063 | 12/1998 | Weaver, Jr. et al. .................... | 370/331 |
| 5,854,785 | 12/1998 | Wiley ...................................... | 370/332 |

*Primary Examiner*—Reinhard J. Eisenzopf
*Assistant Examiner*—Charles N. Appiah
*Attorney, Agent, or Firm*—Bruce E. Garlick

[57] ABSTRACT

A wireless communication system facilitates wireless communication with a mobile unit within a respective service area. The wireless communication system includes a mobile switching center and a plurality of base stations. Each base station couples to the mobile switching center and provides wireless communication within a respective cell or within a plurality of respective sectors. Each base station provides a pilot signal that may be received by the wireless mobile unit. With multiple sectors, a pilot signal is provided for each sector. The mobile unit may wirelessly connect to any of the base stations' cells and sectors. A determination of whether to be connected to a particular base station cell and/or base station sector is based upon the relative strengths of pilot signals received by the wireless mobile unit. The mobile unit may evaluate the relative strengths of received pilot signals and simply request a connection to a base station or a disconnection therefrom based upon the evaluation. However, the mobile unit may also notify the mobile switching center of strengths of received pilot signals with the mobile switching center taking action. In such case, the mobile switching center may determine thresholds and pass the thresholds to the mobile unit for later use, the thresholds based upon the relative strengths of the pilot signals. A corresponding method includes steps for operating a wireless communication system.

41 Claims, 11 Drawing Sheets

STATES AT MOBILE UNIT POSITION 230

| BS | PC/I | PRIOR SET | NEW SET |
|---|---|---|---|
| A | -14 | ACTIVE | CANDIDATE |
| B | -25 | NEIGHBOR | NEIGHBOR |
| C | -25 | NEIGHBOR | NEIGHBOR |
| D | -25 | NEIGHBOR | NEIGHBOR |
| E | -20 | NEIGHBOR | NEIGHBOR |
| F | -10 | ACTIVE | ACTIVE |
| G | -7 | ACTIVE | ACTIVE |

STATES AT MOBILE UNIT POSITION 232

| BS | PC/I | PRIOR SET | NEW SET |
|---|---|---|---|
| A | -12 | CANDIDATE | ACTIVE |
| B | -20 | NEIGHBOR | NEIGHBOR |
| C | -20 | NEIGHBOR | NEIGHBOR |
| D | -20 | NEIGHBOR | NEIGHBOR |
| E | -17 | NEIGHBOR | NEIGHBOR |
| F | -8 | ACTIVE | ACTIVE |
| G | -14 | ACTIVE | CANDIDATE |

STATES AT MOBILE UNIT POSITION 234

| BS | PC/I | PRIOR SET | NEW SET |
|---|---|---|---|
| A | -7 | ACTIVE | ACTIVE |
| B | -17 | NEIGHBOR | NEIGHBOR |
| C | -17 | NEIGHBOR | NEIGHBOR |
| D | -17 | NEIGHBOR | NEIGHBOR |
| E | -16 | NEIGHBOR | NEIGHBOR |
| F | -17 | ACTIVE | NEIGHBOR |
| G | -15 | CANDIDATE | ACTIVE |

FIG. 4

WIRELESS COMMUNICATION SYSTEM HAVING HAND-OFF BASED UPON RELATIVE PILOT SIGNAL STRENGTHS

BACKGROUND

1. Technical Field

The present invention relates generally to the field of wireless communication; and more particularly to a wireless communication system in which multiple connections are possible between a mobile unit and a plurality of base stations, connections between the mobile unit and the plurality of base stations are determined based upon the relative strength of pilot signals received by the mobile unit from the plurality of base stations.

2. Related Art

Wireless communication systems are well known in the Art. Examples of such wireless communication systems include cellular phone systems in which wireless communications are provided within a service area. In a typical wireless communication system a plurality of base stations or base transceiver stations each provide wireless coverage within a particular cell. Each base station may provide a plurality of sectors that form a respective cell. References made herein to base stations or cells also include reference to base station sectors. The base stations are coupled to a mobile switching center (MSC) which provides an interconnection between the base stations and the public switch telephone network. In combination, the MSC and these base stations manage ongoing communication within the service area and are commonly referred to as the "network."

Various protocols exist to manage communications within the service area. Such protocols include, for example, the Advanced Mobile Phone System (AMPS) standards, the Narrowband Advanced Mobile Phone Service (NAMPS) standards, the Global Standard for Mobility (GSM), the Code Division Multiple Access (CDMA) standard and the Time Division Multiple Access (TDMA) standard among others. While typical wireless communication systems may support only a single protocol within its service area, as systems progress, many systems provide support for multiple protocols within the service area.

Basic goals exist for operating mobile communication systems. Call clarity, call coverage, availability of carrier, maximum user density, and minimization of dropped calls are basic goals in operating the wireless communication system. As is known, depending upon the communication protocol supported by the communication system, reaching such goals must be accomplished in different fashions. For example, in a CDMA system, each base station can provide only a maximum power output within its respective cells or sectors. This maximum power output must be divided among the mobile units operating within the respective cells or sectors. Thus, as the number of mobile units operating within a cell or sector increases, the additional amount of power available for new mobile units decreases until a minimal level is reached and a maximum number of users has been reached for the cell or sector. Dividing the power in such a fashion sometimes results in dropped calls due to the signal strength going below a required threshold. Thus, it is desirable to only communicate with those mobile units within the base station's range as is required.

In CDMA systems, to minimize the dropped call probability and to improve call quality, mobile units typically communicate with more than one base station (cell) or more than one sector of a particular base station. Operations relating to the addition of a communication link between a mobile unit and a cell/sector is commonly referred to as a "hand-off". Hand-off operations also include dropping connections between the mobile unit and a cell/sector. When mobile units roam through a service area served by multiple base stations (cells and/or sectors), based upon continual evaluations by the mobile unit and communications with the network, hand-off operations occur frequently.

In prior systems operating according to the IS-95A CDMA standard, a determination of whether the mobile unit would seek connection to a particular cell/sector was made based upon the strength of a pilot signal received/measured from the cell/sector. When the strength of the pilot signal exceeded a threshold, the mobile unit notified the base station(s) with which it was already communicating by sending a pilot strength measurement message (PSMM). The PSMM was received by the network, and the network then made a determination as to whether the mobile unit should begin communication with the additional cell/sector. The determination was based in part on whether resources were available. If such was the case, a hand-off direction message (HDM) or an extended hand-off direction message (EHDM) was sent to the mobile unit. Upon receiving the HDM, the mobile unit added the new sector or cell to its active set and acknowledged such addition via a hand-off completion message (HCM).

However, if the network determined that the mobile unit should not add the new cell/sector to its active set, the network acknowledged the PSMM with a base station acknowledgment order (BSAO) but did not send the HDM. Such action prevented the mobile unit from again sending PSMMs for the particular candidate cell or sector until its pilot signal strength exceeded the weakest pilot signal strength of a cell or sector in the active set by the level T_COMP. If such occurred, a second PSMM was sent for the cell or sector. The details of such operation are more specifically spelled out in the specifications for the IS-95A CDMA standard.

These techniques, however, had various shortcomings. The technique did not consider how many cells or sectors the mobile unit already had in its active set (those with which communication already was established). Thus, it was unknown whether adding an additional cell or sector to the active set would reduce the probability of a dropped call and increase call quality. However, by adding a cell or sector to the active set, its available power that could be delivered to other mobile units decreased, resulting in reduced network capacity.

Further, the thresholds used in determining whether to seek communication with another cell/sector were typically set in a fixed fashion for the duration of the call and did not consider the various other operating conditions faced by the mobile unit within the service area. In some cases, if the mobile unit was operating in a fringe area, it may be beneficial to add cells/sectors to the active set even if the pilot signals are relatively weak as compared to the fixed thresholds. Such additions often times decreased the probability of dropped calls and increased call quality.

An additional problem with such prior art technique relates to the construction of the mobile units. The mobile units typically include a rake receiver that could demodulate a maximum number of signal paths, typically three signal paths. As additional cells/sectors were added to the active set, to achieve a benefit from such addition, communications received from the additional cells/sectors had to be demodulated. However, because the mobile units could only demodulate a limited number of signal paths, the mobile units could often not demodulate all signals intended for it from the network. This problem increased system traffic and noise and reduced system capacity with no benefit to the intended mobile unit.

Thus, there exits a need in the art for a wireless communication system having improved hand-off performance, with such improved hand-off performance based upon the benefit of handoffs and implemented in a fashion to reduce dropped call probabilities, to reduce hardware resource requirements, to increase call quality and to increase network capacity.

SUMMARY OF THE INVENTION

A wireless communication system according to the present invention facilitates wireless communication with a mobile unit within a respective service area. The wireless communication system includes a mobile switching center and a plurality of base stations. Each base station couples to the mobile switching center and provides wireless communication. Further, each base station provides a unique pilot signal that may be received by the wireless mobile unit. The mobile unit wirelessly connects to at least one of the base stations. However, a determination of whether to be connected to a particular base station is based upon the relative strengths of pilot signals received (and measured) by the wireless mobile unit.

Each of the base stations may include a plurality of sectors. In such a construction, the base station may communicate with mobile units in more than one of the plurality of sectors. When a base station includes more than one sector, the base station provides a unique pilot signal for each sector. A determination of whether to connect to a particular sector of the base station is based upon the relative strengths of pilot signals measured by the wireless mobile unit, such pilot signals transmitted from more than one sector of a common base station, from multiple base stations or from multiple sectors of multiple base stations. The teachings of the present invention apply equally to single-sectored base stations, multi-sectored base stations and multiple multi-sectored base stations. References made hereinafter to "base stations" apply as well to sectors of a single base station and to sectors of multiple base station.

In one embodiment, the mobile unit evaluates the relative strengths of received pilot signals and requests a connection to a base station based upon the evaluation. The evaluation includes both measuring the strength of the received pilot signals, evaluating the strength of the pilot signals with respect to reference level(s). The mobile unit may also evaluate the relative strengths of received pilot signals and request a release from a connection to a base station based upon the evaluation.

In one embodiment, a connect threshold level is determined based upon relative strengths of pilot signals received, and as measured, by the mobile unit. The connect threshold is then used to determine whether to initiate a connection to a particular base station, such determination based upon a comparison of the strength of a respective pilot signal to the connect threshold. The connect threshold may be determined based upon the strength or relative strength of one or more pilot signals received by the mobile unit.

A drop threshold may also be determined based upon relative strengths of pilot signals received by the mobile unit. This drop threshold may then be used in determining whether to initiate a drop of a connection with a particular base station. In such a determination a comparison may be made between the strength or relative strength of a respective pilot signal and the drop threshold. The drop threshold may be determined based upon the strength of one or more pilot signals received by the mobile unit from connected base stations. In another related embodiment, the MSC sends drop thresholds and add thresholds to the mobile unit based upon the number of base stations in the mobile station's active set.

In still another embodiment, the mobile unit notifies the mobile switching center of measured strengths of received pilot signals. The mobile switching center then determines whether to establish or remove a connection between the mobile unit and one or more of the plurality of base stations based upon relative strengths of the pilot signals. In such embodiment, the mobile unit notifies the mobile switching center of the strengths of received pilot signals based upon a comparison of the strengths of the pilot signals to message triggering thresholds previously received from the mobile switching center.

A method of operating a wireless communication system according to the present invention facilitates wireless communication with a mobile unit operating within a respective service area. According to such method, the wireless communication system may include a plurality of base stations, each of which may include a plurality of sectors. The method includes broadcasting a plurality of pilot signals, each of the pilot signals corresponding to a respective one of a plurality of base stations or sectors. The method also includes receiving, by the mobile unit, a plurality of the pilot signals. The method then includes measuring respective strengths of the pilot signals. Finally, the method includes establishing connections between the mobile unit and the plurality of base stations or sectors based upon the relative strengths of one or more of the pilot signals to appropriate thresholds received by the wireless mobile unit. The method includes additional features based, in part, upon the structures described above.

Moreover, other aspects of the present invention will become apparent with further reference to the drawings and specification which follow.

BRIEF DESCRIPTION OF THE DRAWINGS

FIG. 1 is a block diagram illustrating a wireless communication system according to the present invention in which the relative strengths of one or more pilot signals received by a mobile unit are used in determining which base stations the mobile unit should communicate with;

FIG. 4 is a diagram illustrating various signal strengths and operating conditions consistent with the movement of the mobile unit within the service area described with reference to FIG. 2;

DETAILED DESCRIPTION OF THE DRAWINGS

Figure 1:
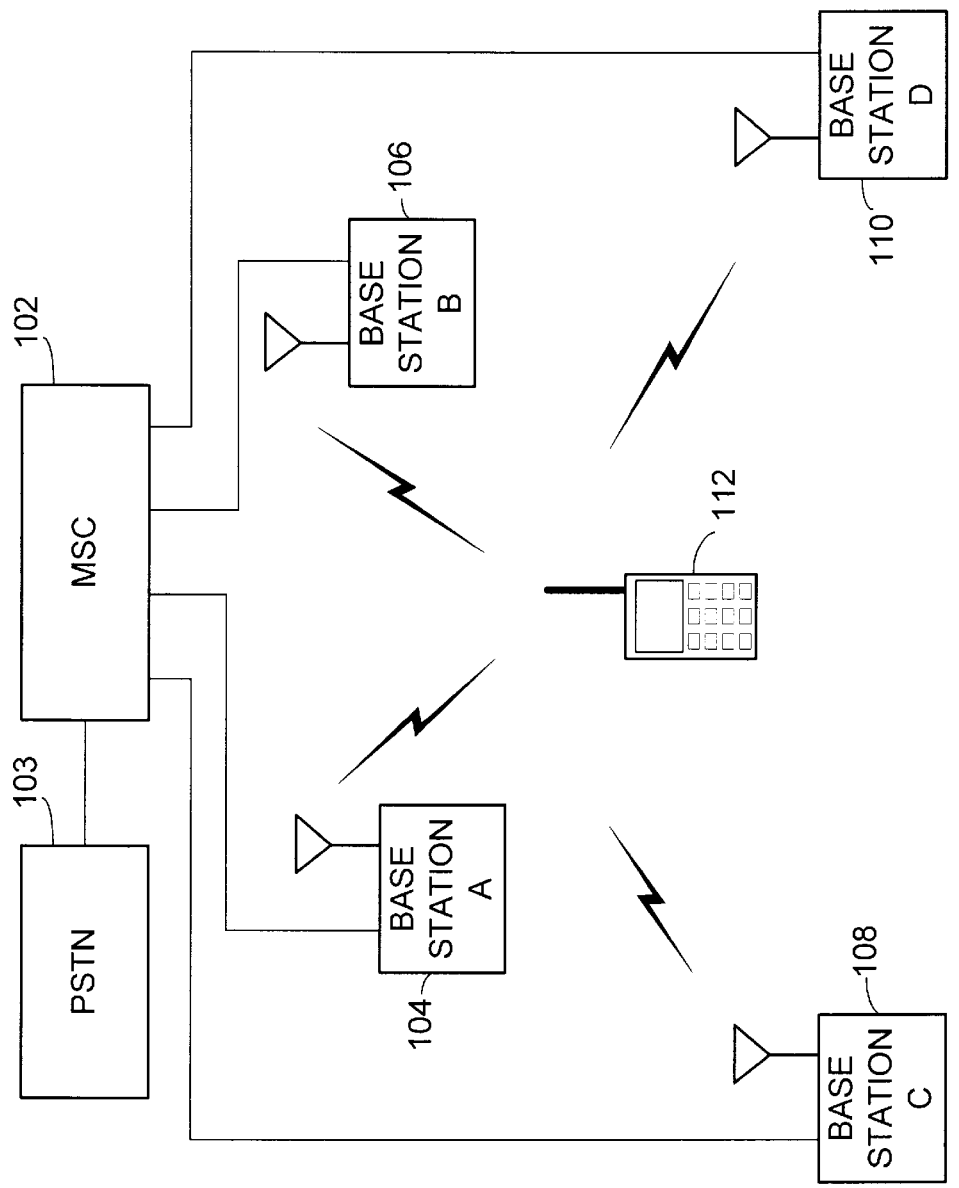

FIG. 1 illustrates a wireless communication system 100 constructed according to the present invention that facilitates wireless communication with a mobile unit 112 operating within a respective service area. The wireless communication system 100 includes a mobile switching center 102 (MSC) and a plurality of base stations 104, 106, 108, and 110 coupled to the MSC 102. Together, these components are referred to as the "network." Each of the base stations 104 through 110 provides wireless coverage within a particular cell. Each of the base stations may also provide wireless coverage within a plurality of sectors that make up its cell. For example, base station A 104 may provide coverage in three sectors, each of which may span 120 angular degrees from the physical location of the antennae of base station A 104. The teachings of the present invention apply to both inter-cell operations and inter-sector operations.

The public switch telephone network 103 (PSTN) couples to the mobile switching center 102. Thus, with the base stations 104 through 110 providing wireless communications within the service area, the mobile unit 112 may establish a call between wired phones connected to PSTN 103 or with other wireless mobile units operating within this or other service areas.

Establishing communications with each of the base stations 104 through 110, the mobile unit 112 first receives a pilot signal emanating from a respective base station (or sector). Such pilot signal may be referred to differently depending upon the particular construction of the wireless communication system 100. For example, in a CDMA type system, the pilot signal is described simply as a pilot signal. However, in systems operation under other protocols, the pilot signal may be described as a beacon signal. Simply stated, the pilot signal strength serves to indicate to mobile units operating within the service area that a particular base station (or sector) is available for the establishment of a communication link.

In the described embodiment, the mobile unit 112 continuously scans for pilot signals from the base stations 104, 106, 108 and 110 providing service within the service area. Upon receiving a particular pilot signal emanating from a base station (or sector) with which the mobile unit 112 does not currently communicate, and upon meeting predetermined criteria, the mobile unit indicates to the network via a previously established communication link that it has measured a new pilot signal that meets the criteria for successful demodulation.

In an exemplary operation, mobile unit 112 has previously established ongoing communication with base station A 104. The mobile unit 112 also receives pilot signals from base station B 106, base station C 108 and base station D 110 at particular respective strengths. According to the present invention, the mobile unit 112 may request to establish communications with any of the base stations 104 through 110. However, in accordance with the present invention, in determining which of the base stations with which to communicate, the wireless communication system 100 considers the relative strength of pilot signals as measured by the mobile unit 112.

As compared to prior techniques which considered the measured absolute strength of pilot signals received from the base stations as compared to fixed thresholds, the wireless communication system 100 of the present invention considers the relative strengths of the pilot signals received by the mobile unit 112. In one embodiment, pilot strength measurement messages (PSMMS) or related messages are triggered based upon the relative strengths of pilot signals received by the mobile unit 112. In another embodiment, new trigger thresholds are determined by the network based upon the relative strengths of the pilot signals reported in previous PSMMs and PSMMs are triggered based upon a comparison of the absolute strength of the pilot signals received/measured as compared to the updated trigger thresholds. The PSMMs contain absolute strengths of each pilot signal received for active set and candidate set base stations (or sectors) and the network determines which connections to make based upon the relative strengths of the pilot signals via a predetermined algorithm. In such a case, the trigger thresholds employed in determining whether to send the PSMM may be implemented according to IS-95A parameters, e.g. T_ADD, T_DROP, etc. However, in other cases, new triggering thresholds may be developed according to the principles of the present invention in future standards without departing from the teachings of the present invention.

Figure 2:
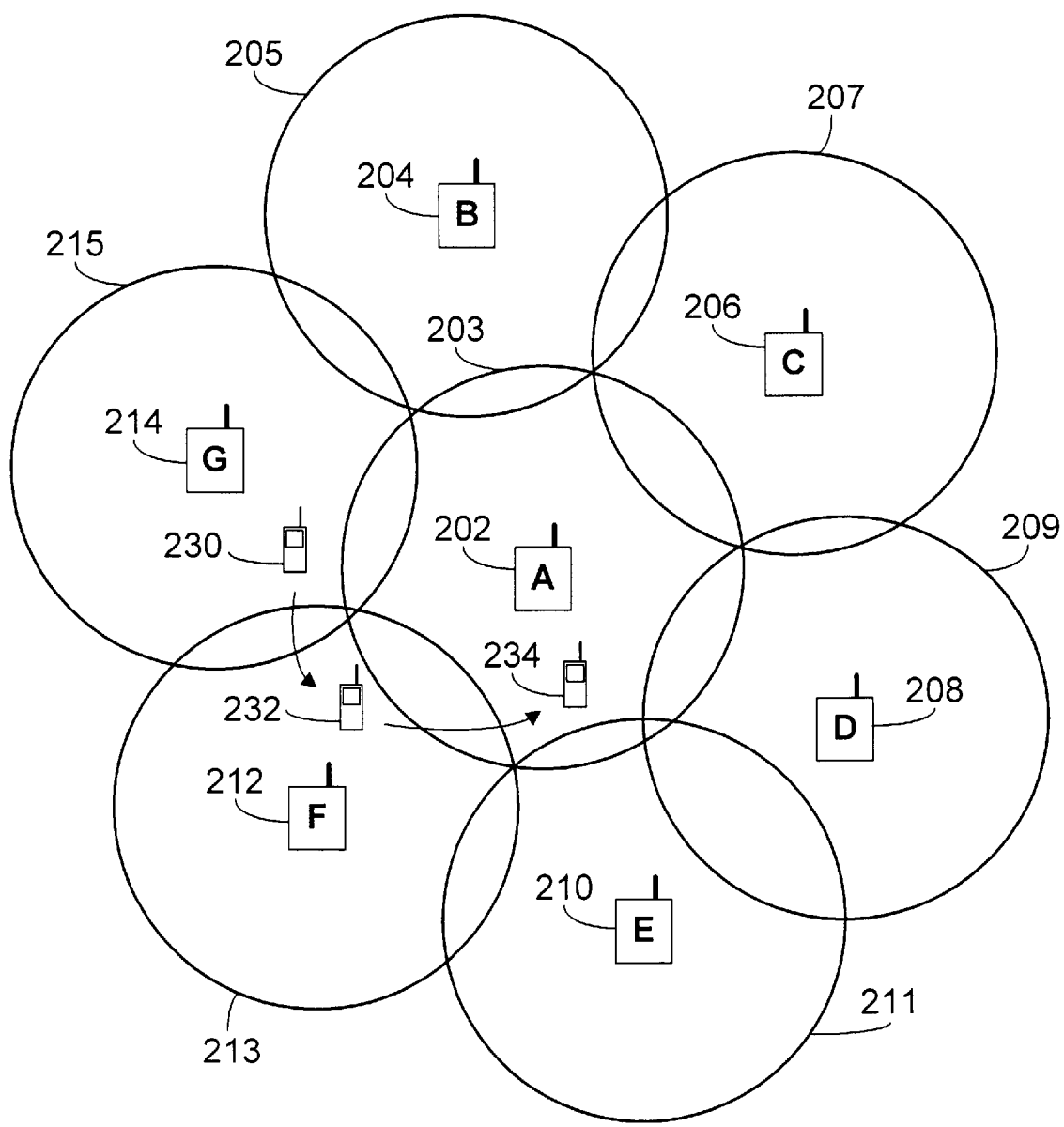
FIG. 2 is a diagram illustrating operation of a mobile unit in moving between cells of a wireless communication system constructed according to the present invention.

FIG. 2 illustrates the operation of the wireless communication system when a mobile terminal roams throughout a respective service area served by base stations 202, 204, 206, 208, 210, 212, and 214. Each of the base stations 202 through 214 provides coverage within a particular cell. For example, base station A 202 provides wireless coverage within cell 203. Further, base stations B 204, base station C 206, base station D 208, base station E 210, base station F 212, and base station G 214 provide wireless coverage within cells 205, 207, 209, 211, 213, and 215, respectively.

As illustrated, the mobile unit moves from position 230 within cell 215 served by base station G 214 to cell 213 serviced by base station F 212 at position 232. From position 232, the mobile unit moves from cell 213 served by base station F 212 to cell 203 served by base station A 202. At each of these positions 230 through 234, the mobile unit will measure the strength of pilot signals received from each of the base stations 202 through 214. However, the strength of pilot signals received from each of the base signals 202 through 214 will likely differ. To reduce the dropped call probability and to improve call quality for the mobile unit operating within the service area, it may be advantageous for the mobile unit to communicate with more than one base station at any particular point in time. Under the CDMA standard, such simultaneous operation is provided.

When the mobile unit moves from position 230 to 232, a soft hand-off from base station G 214 to base station F 212 will occur. During such soft hand-off, the mobile unit should communicate with both base stations 212 and 214. However, to maximize system capacity, the mobile unit should not be connected to more base stations than are required to minimize dropped call probabilities and to improve call quality since having excess connections decreases system capacity without providing benefit. Operation during the movement of mobile unit from position 230 to position 234 and how such hand-offs are accomplished according to the present invention will be discussed further herein with respect to FIG. 4.

Figure 3:
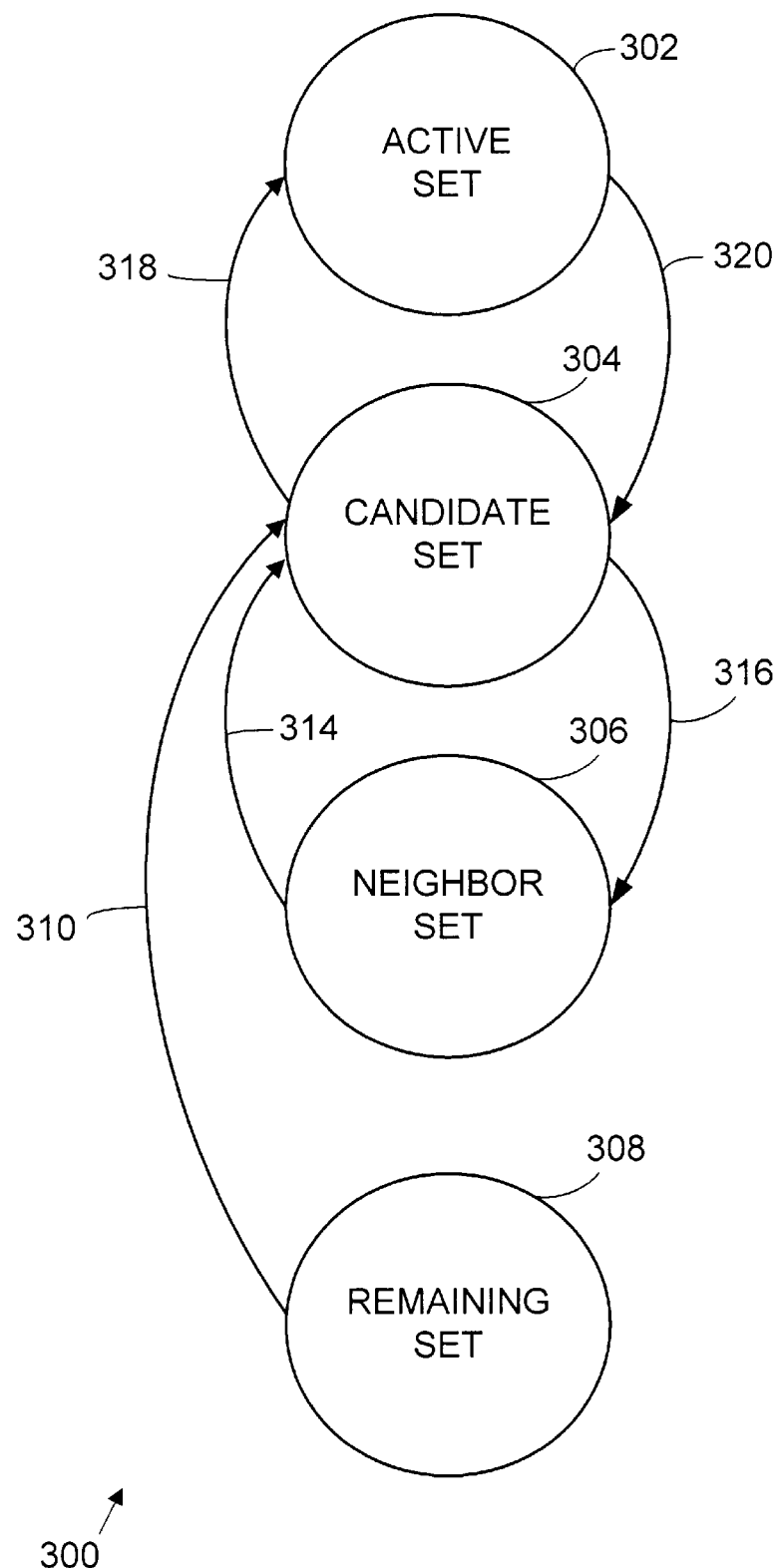
FIG. 3 is a diagram illustrating categorization of connections made between a mobile unit and base stations in the wireless communication system according to the present invention that uses set management techniques consistent with the IS-95A CDMA standard.

FIG. 3 is a diagram illustrating the categorization of connections by the mobile unit of the wireless communication system according to the present invention based upon IS-95A CDMA standard set management. Such categorization 300 includes the active set 302, the candidate set 304, the neighbor set 306, and the remaining set 308. As was previously stated, references herein relate to base station connections. However, the principles set forth also apply to the connections made to sectors of base stations. Each of the base stations provided by the wireless communication system will be categorized within one of these sets of the categorization 300 of FIG. 3. The active set 302 includes those base stations with which the mobile unit is presently communicating. The candidate set 304 includes those base stations with which the mobile unit may soon be communicating or those base stations with which the mobile unit was previously communicating. The neighbor set 306 represents those base stations that are close enough to the mobile unit such that they may be moved to the candidate set 304 or the active set 302. The remaining set 308 includes the remaining base stations of the wireless communication system supported by the respective MSC.

Upon activation of the particular wireless communication system the contents of the active set 302, the candidate set 304, the neighbor set 306, and the remaining set 308 are determined. Initially, most base stations are placed in the remaining set 308. Typical activation causes one base station to be placed in the active set 302, a number of base stations placed in the neighbor set 306 and the remaining base stations placed in the remaining set 308. Then, base stations are moved from the neighbor set 306 or remaining set 308 to the candidate set 304 based upon the strength of pilot signals as measured by the mobile unit and additional criterion. Once a call is initiated with the one active set 302 pilot signal, the network sends a message that contains a set of neighbor set 304 pilot signal identifiers that the mobile unit is to use to set the content of the neighbor set 304. The remainder of the pilot set signals received remain in the remaining set 308. The mobile unit may move a base station to the active set 302 only in cooperation with the network via transmission of a PSMM with the network responding via a HDM, an EHDM or another message.

In moving base stations among the sets, the strength of pilot signals is evaluated. Particular criterion used in evaluating pilot signal strengths may include the IS-95A parameters T_ADD, T_DROP, T_TDROP, and T_COMP or other handoff triggering parameters. According to the present invention, the parameters T_ADD, T_DROP, T_TDROP, and T_COMP are determined by the network or by the mobile unit based upon the relative strengths of one or more pilot signals received by the mobile unit. In one embodiment, the mobile unit transmits the strengths of active set and candidate set pilot signals received by the mobile unit in the form of a PSMM. The network receives the strength of these pilot signals, establishes the triggering parameters and transmits the new triggering parameters back to the mobile unit, perhaps in the form of an HDM, EHDM or another similar message.

In another embodiment, that is not IS-95A compliant, the mobile unit calculates similar triggering parameters, based upon the relative strengths of the pilot signals. In still another embodiment, the mobile unit calculates the parameters based upon the relative strengths of the pilot signals as well as parameters received from the network. As is appreciated, operations based upon relative pilot signal strengths may be implemented in various other manners as well.

Base stations may be moved from the remaining set 308 and the neighbor set 306 to the candidate set 304 along paths 310 and 314, respectively, based upon various criteria, including the strength of pilot signals received from particular base stations. According to the present invention, the parameters T_ADD, T_DROP, etc. or similar triggering parameters may be determined by the network based upon the relative strength of one or more pilot signals received from the mobile unit in a PSMM or similar message. Further, PSMMs or similar messages may be triggered by the mobile unit based upon comparisons of active set 302 members to such drop/add triggering parameters.

Base stations may be moved from the candidate set 304 to the active set 302 first by satisfying the criterion that the pilot signal strengths for the particular base station equals or exceeds the parameter T_ADD or similar handoff triggering parameter. Upon the satisfaction of such determinate criterion, a PSMM will be sent from the mobile unit to the base stations already in the active set with which the mobile unit has established communication. The network, upon receiving the PSMM, makes a determination of what additional connections, if any, should be made between the mobile unit and base stations satisfying the criterion. Particular embodiments for making such determination will be described further herein. However, such determinations each include using the relative strengths of the pilot signals in determining which connections to establish, which connections to maintain, and which connections to drop. Additional criterion could also look at the absolute strength of the pilot signals contained in the PSMM sent from the mobile unit to the base station.

Once a determination has been made as to whether an additional connection should be established, the network sends a HDM to the mobile unit directing the mobile unit to add an additional base station or base stations to its active set. After receipt of the HDM, the mobile unit adds the base station to the active set and responds with a hand-off completion message (HCM). Upon the completion of such connection, the mobile unit will now be in communication with such additional base stations as have been added.

As previously discussed, the parameter T_COMP is used when comparing the strength of pilot signals received from base stations in the candidate set 304 to the strength of pilot signals received from base stations in the active set 302 in triggering PSMMs. When a PSMM had previously been sent by the mobile unit, triggered by the strength of a particular pilot signal, but the network responded with a base station acknowledgment order (BSAO), the parameter T_COMP or similar parameter is used in comparison of the strength of the pilot signal to the strength of pilot signals respective to base stations in the active set 302. When the comparison is favorable, another PSMM is sent. This sequence continues for additional comparisons should the respective base station not be added.

Base stations move from the active set 302 to the candidate set 304 when the strength of respective pilot signals is below T_DROP or similar parameter for T_TDROP seconds. However, as with movement of base stations from the candidate set 304 to the active set 302 via path 318, moving base stations from active set 302 to candidate set 304 via path 320 also requires interaction with the network. The mobile unit sends a PSMM to the network when the pilot signal of one or more of the base stations in the active set 302 is less than T_DROP for a period equal to or greater than T_TDROP seconds. In response, the network sends a HDM to the mobile unit directing the mobile unit to move the base station out of the active set 302. Upon completion of moving the base station to the candidate set 304, the mobile unit responds to the network with the HCM. After such operations, the hand-off is complete and the active set has been reduced. When a base station moves from the active set 302 to the candidate set 304, it may also move directly to the neighbor set 306 via path 316 if the timer T_TDROP had expired and the strength of the respective pilot signal was below T_DROP for the duration of the time to out.

FIG. 4 illustrates operation of the wireless communication system of the present invention previously illustrated and with reference to FIG. 2. Such description with reference to FIG. 4 also includes reference to the active set 302, the candidate set 304, the neighbor set 306 described with reference to FIG. 3. FIG. 4 includes three separate tables, the tables providing information corresponding to positions 230, 232, and 234 illustrated in FIG. 2. In the operation described, a PSMM is sent at position 230, 232 and 234. The sets are altered based upon the contents of the PSMM and actions of the network in response to the PSMM. In each table, a prior content set state and a subsequent content set state for the particular position are indicated. Operations to alter the contents of the set at each position are assumed to have occurred at the particular position.

The state of the mobile unit at position 230 indicates the strength of pilot signals in decibels (dB) received from base stations A through G, 202 through 204, respectively. The state includes the contents of the active set 302, candidate set 304 and neighbor set 306 prior to an operation according to the present invention, and after an operation according to the present invention. Prior to operation at position 230 base stations A, F, and G were in the active set 302, with pilot strength signals of −14 dB, −10 dB, and negative 7 dB, respectively. Thus, from strongest to weakest pilot signals, base stations, are ordered as G, F, A, E, B, C, and D. After operation according to the present invention, base station A, the third weakest pilot signal received, moves from the active set to the candidate set. However, base stations G and F remain in the active set.

Such determination to remove base station A from the active set and place it in the candidate set is based upon the relative strengths between pilot signal corresponding to base station G and pilot signal corresponding to base station A. A threshold cut-off of 5 dB between the strongest pilot signal −7 dB, and the third strongest pilot signal −14 dB indicates that the base station corresponding the third strongest pilot signal should be moved out of the active set 302. However, since the strength of the third strongest pilot signal, pilot signal corresponding to base station A, was not below T_DROP for T_TDROP seconds, the mobile station keeps it in the candidate set.

When the mobile unit moves from position 230 to position 232 the strengths of pilot signals received from the base stations 202 through 214 change. In position 232, the strength of the pilot signals from strongest to weakest shows that the pilot signal corresponding to base station F is the strongest at −8 dB, the strength of the pilot signal from base station A is the next strongest at −12 dB, the pilot signal received from base station G is the subsequently strongest at −14 dB and the pilot signal received from base station E is the next strongest at −17 dB. Pilot signals received from base stations B, C and D are weaker still at −20 dB. Thus, at position 232, the strongest pilot signal is from base station F at −8 dB. Since base station F was already in the active set, it remains in the active set after the operation. The next strongest pilot signal of −12 dB received from base station A causes the network to direct the mobile unit to move base station A from the candidate set to the active set since Pc/i for base station A is greater than Pc/I for base station G+T_COMP. Further, since the difference between the strength in pilot signals from base station F at −8 dB and base station G at −14 dB exceeds 5 dB, base station G is moved from the active set to the candidate set. The membership of the other base stations remains unchanged.

When the mobile unit moves from position 232 to 234 the strength of the pilot signals received by the mobile unit also changes. At position 234, the strongest pilot signal is received from base station A and is −7 dB. Subsequent pilot signals ranked in relative strengths are from base station G at −15 dB, from base station E at −16 dB, with the other pilot signals at −17 dB. Since base station A provides the strongest pilot signal of −7 dB, the base station A remains in the active set 302. Now, since base station G has the second strongest pilot signal at −15 dB, it is moved from the candidate set to the active set. However, since the strength of the pilot signal from base station F is −17 dB and is 10 dB weaker than the pilot signal from base station A, the base station F is moved to either the candidate set or the neighboring set depending upon the duration at which the strength of the pilot signal has been at its current level. If the duration T_TDROP has expired, as illustrated, base station F is moved from the active set to the neighboring set. The state of other base stations remains unchanged.

Figure 5:
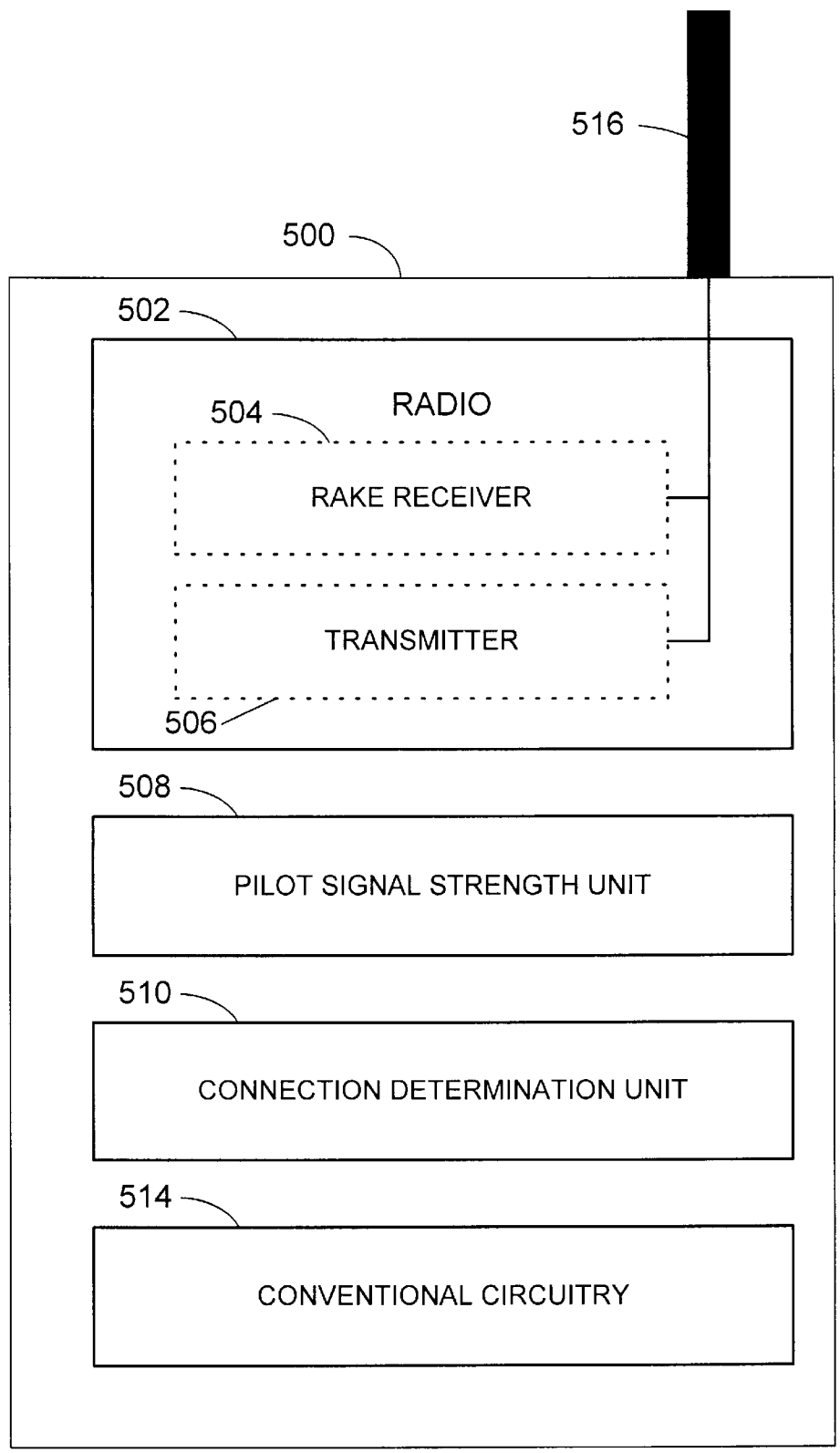
FIG. 5 is a block diagram illustrating generally the construction of a mobile unit constructed according to the present invention.

FIG. 5 is a block diagram illustrating construction of a mobile unit according to the present invention. The mobile unit 500 includes a radio 502, a pilot strength signal unit 508, a connection determination unit 510, and conventional circuitry 514. The radio 502 includes a rake receiver 504 and a transmitter 506, each coupled to an antennae 516. The rake receiver of the radio 502 scans the frequency band within which the mobile unit 500 operates. For example, in a CDMA system, this frequency range may be in the range of 850 MHz or may also be in the range of 1900 MHz, the PCS frequency.

The rake receiver 504 typically includes a scanning finger which scans for pilot signals emanating from base stations within the frequency range. Typically, in CDMA, the rake receiver 504 determines energy across the band and correlates to the energy. Based upon a PN offset of the PN sequence to the pilot signal, the mobile unit 500 can identify the base station to the network via a PSMM message. Other fingers of the rake receiver 504 demodulate the most powerful multi-path signals as determined by the scanning finger of the rake receiver 504. In typical mobile units 500, the number of fingers available for demodulation are limited. Therefore, the mobile unit 500 may demodulate signals from a limited number of base stations. Further, when a particular base station has multiple multi-paths to the mobile unit 500, each finger of the rake receiver 504 focuses upon a multi-path signal. Thus, multi-paths further reduces the number of base stations from which the mobile unit 500 may receive communications.

The pilot signal strength unit 508 couples to the radio 502 and determines the strengths of the pilot signals found by the rake receiver 504. Such pilot signal strength unit 508 communicates the strength of pilot signals to the network when such information is required. The pilot signal strength unit works in conjunction with the radio 502 and the rake receiver contained therein.

The connection determination unit 510 works in cooperation with the network in establishing connections between the mobile unit 500 and base stations within the wireless communication system. The connection determination unit 510 may establish thresholds to which signal strengths determined by the pilot signal strength unit 508 are compared. These thresholds could be based upon the relative strengths of the pilot signals determined by the pilot signal strength unit 508 or it could be based upon other thresholds and values relayed to the mobile unit 500 by the network. In any case, the pilot signal unit 508 and the connection determination unit 510 work together in determining which base stations are candidates to become members of the active set 302.

The mobile unit 500 also includes conventional circuitry for providing conventional functions within the mobile unit 500. Such convention circuitry 510 includes processing circuitry, signal conversion circuitry, and other circuitry required for operations of the mobile unit 500.

Figure 6:
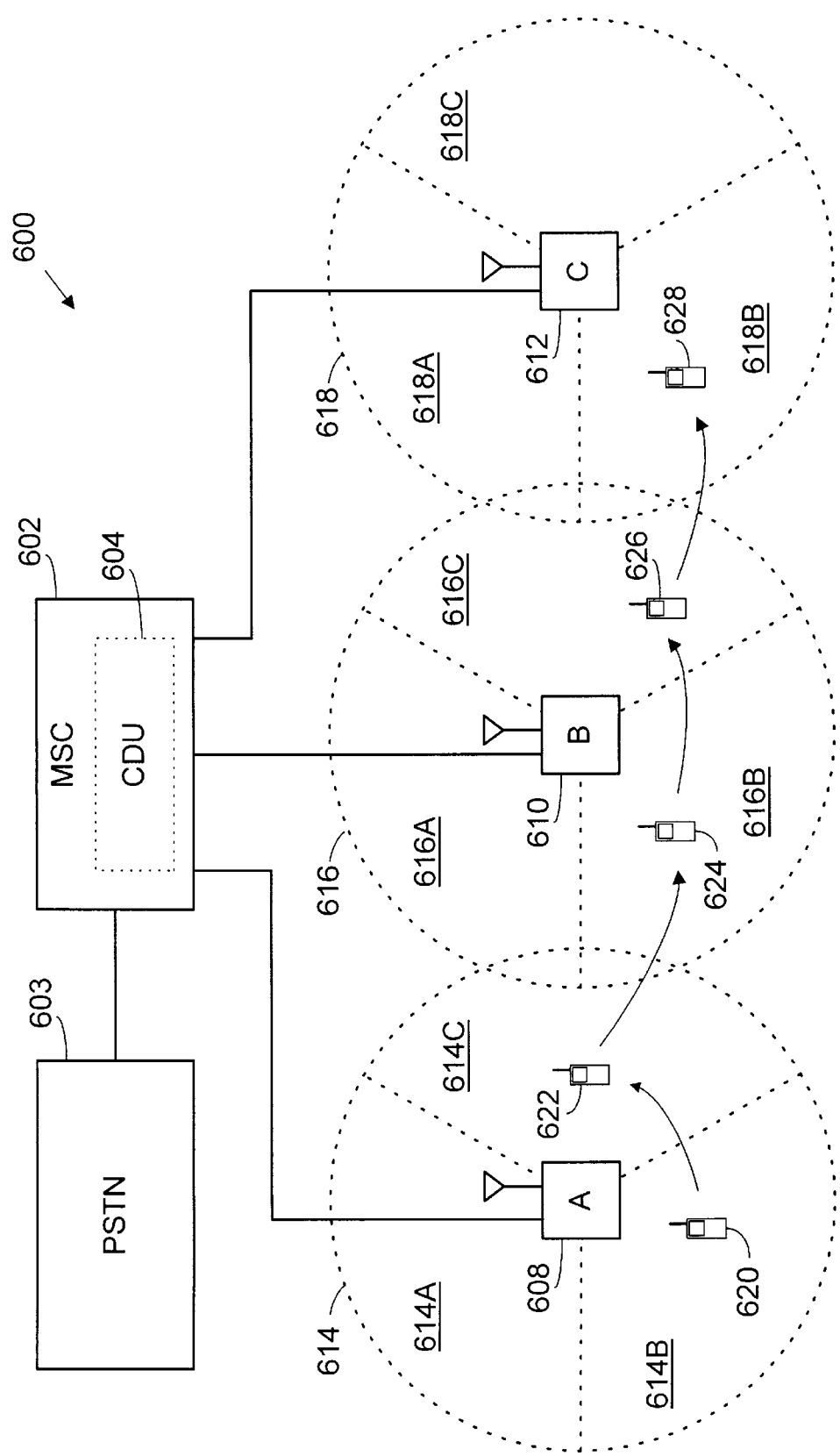
FIG. 6 is a diagram illustrating a wireless communication system constructed according to the present invention wherein hand-offs between base stations as well as between sectors provided by the base stations are described.

FIG. 6 illustrates a wireless communication system 600 according to the present invention within which softer hand-offs are made between sectors of base stations in addition to the soft hand-offs made between base stations. The wireless communication system 600 includes an MSC 602 coupled to the PSTN 603 and base stations 608, 610, and 612. The MSC 602 includes a connection determination unit 604 which operates in cooperation with the mobile units operating in the system 600 to perform the soft hand-offs between the base stations and the softer hand-offs between the sectors of the base stations.

As is known, each base station may include multiple directional antennas, each providing service within a particular sector of a cell supported by the base station. For example, base station A 608 serves cell 614 having sectors 614A, 614B and 614C, each providing approximately 120 angular degrees of coverage within the cell 614. Additionally, base station B 610 provides coverage within a cell 616 having sectors 616A, 616B and 616C. Finally, base station C 612 provides coverage within cell 618 having sectors 618A, 618B and 618C. Handoffs between base station 608, 610 and 612 is typically coordinated through the CDU 604 of the MSC 602. However, softer hand-offs between sectors of cells serviced by the base station may be accomplished by functionality located in the base stations themselves or in a combination of functionality between the base stations and the MSC 602.

As an example of operation, mobile unit is shown moving from position 620 to position 622 to position 624 to position 626 and finally to position 628. In such case, mobile unit 620 initially resides within sector 614B served by base station A 608. Moving from position 620 to position 622, a softer hand-off from sector 614B to sector 614C will occur. During such softer hand-off, the mobile unit will be in communication with both sectors 614B and 614C. Further, the mobile unit may be in communication with other sectors and other base stations. Such determinations are made according to the relative strengths of pilot signals received and reported by the mobile unit. Techniques for making such softer hand-offs are accomplished in a same or similar fashion to those techniques previously described for soft hand-offs between base stations.

Moving from position 622 to position 624, the mobile unit goes through a soft hand-off from base station A 608 and sector 614C to base station B 610 and sector 616B. During such soft hand-off, the mobile unit is in communication with both base station A 608 and base station B 610. Moving from position 624 to position 626, the mobile unit moves from sector 616B to sector 616C. Such move is considered a softer hand-off within the cell 616 served by base station 610. Finally, mobile unit moves from position 626 to position 628 in a soft hand-off between base station B 610 and base station C 612. During such soft hand-off, communication is established between the mobile unit and both base station B 610 and base station C 612.

Each of the soft hand-offs and softer hand-off occurring during the movement of mobile unit from position 620 to position 628 is accomplished according to the principles of the present invention relating to one or more pilot signal strengths in their relation to appropriate thresholds. Thus, with the mobile unit communicating with at least two sectors or base stations during any of these soft or softer hand-offs, communication between the mobile unit and the network is maintained. Further, by considering the relative strengths of the pilot signals received and reported by the mobile unit, excessive connections are not established between the mobile unit and sectors or cells of the network. Thus, capacity of the network to establish communications with other mobile units operating in the system are maximized.

Figure 7:
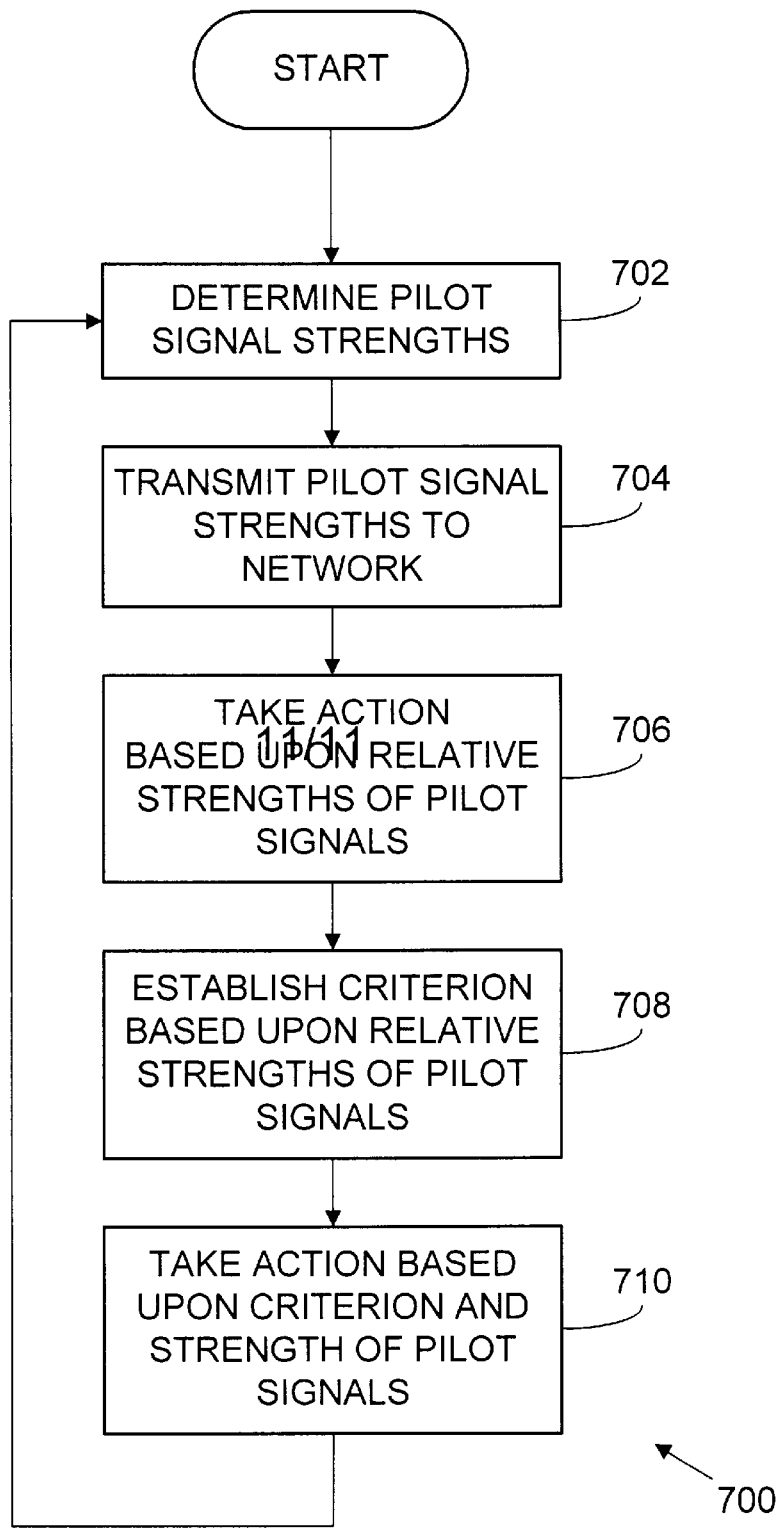
FIG. 7 is a flow diagram illustrating generally operation of a wireless communication system according to the present invention.

FIG. 7 is a flow diagram illustrating operation 700 of a wireless communication system according to the present invention. Operation commences at step 702 wherein the mobile unit measures the pilot signal strengths received. As was previously described, the mobile unit typically will receive pilot signals from multiple cells and/or sectors. The mobile unit via the rake receiver would typically record the relative strengths and absolute strengths of the pilot signals for further use.

Next, at step 704, the mobile unit may transmit pilot signal strengths to the base station. Such pilot signal strengths may be contained within a PSMM or a related message. In transmitting the pilot signal strengths, the mobile unit may rank order the strengths of the pilot signals. Further, the mobile unit may transmit the strengths of pilot signals that are contained only in the candidate set and the active sets. Next, at step 706, the network and/or the mobile unit takes action based upon the relative strengths of the pilot signals. Such action may include deciding to move base stations from the candidate set to the active set, to move base stations from the active set or to do nothing.

Next, at step 708, the network and/or the mobile unit establish criterion such as message triggering thresholds like T_ADD, T_DROP, etc. based upon the relative strengths of the pilot signals. If the pilot signal strengths were transmitted to the base station via the mobile unit, the MSC would typically establish criterion. Such criterion would be transmitted back to the mobile unit. The mobile unit then uses these criterion in sending message that moves base stations between the neighbor set, active set, and candidate set. However, the mobile unit could alone establish criterion based upon the relative pilot signal strengths received.

The network could establish criterion based upon both the pilot signal strengths and parameters received via the PSMM. In a particular implementation, some of the parameters could be based upon strengths of pilot signals in the various sets. For example, the network could generate a T_DROP, T_ADD, T_COMP, etc. or similar parameters based upon the M strength of pilot signals reported in the PSMM which would include pilot signal strengths corresponding to active set and candidate set members. Alternatively, based upon which pilots are in the active set, the network could choose the parameters.

Next, at step 710, actions are taken based upon the criterion generated and based upon the relative strengths of the pilot signals. In one embodiment, decisions are made by the network in connecting the mobile unit to base stations and/or sectors. Further determinations may be made to move base stations from the active set of the mobile unit to the candidate set or neighbor set of the mobile unit. As was previously described, establishing and dropping connections between base stations or sectors requires a combination of actions of the mobile unit and the network. In one embodiment, the information contained in the PSMM received from the mobile unit is used by the network in determining which connections to establish between the network and the mobile unit. The network would then send the HDM to the mobile unit which could include new handoff parameters such as T_ADD, T_DROP, etc. Based on the HDM, the mobile unit would move the subject base stations or sectors to or from the active set and respond to the network with an HCM. From step 710, operation proceeds again to step 702.

Figure 8:
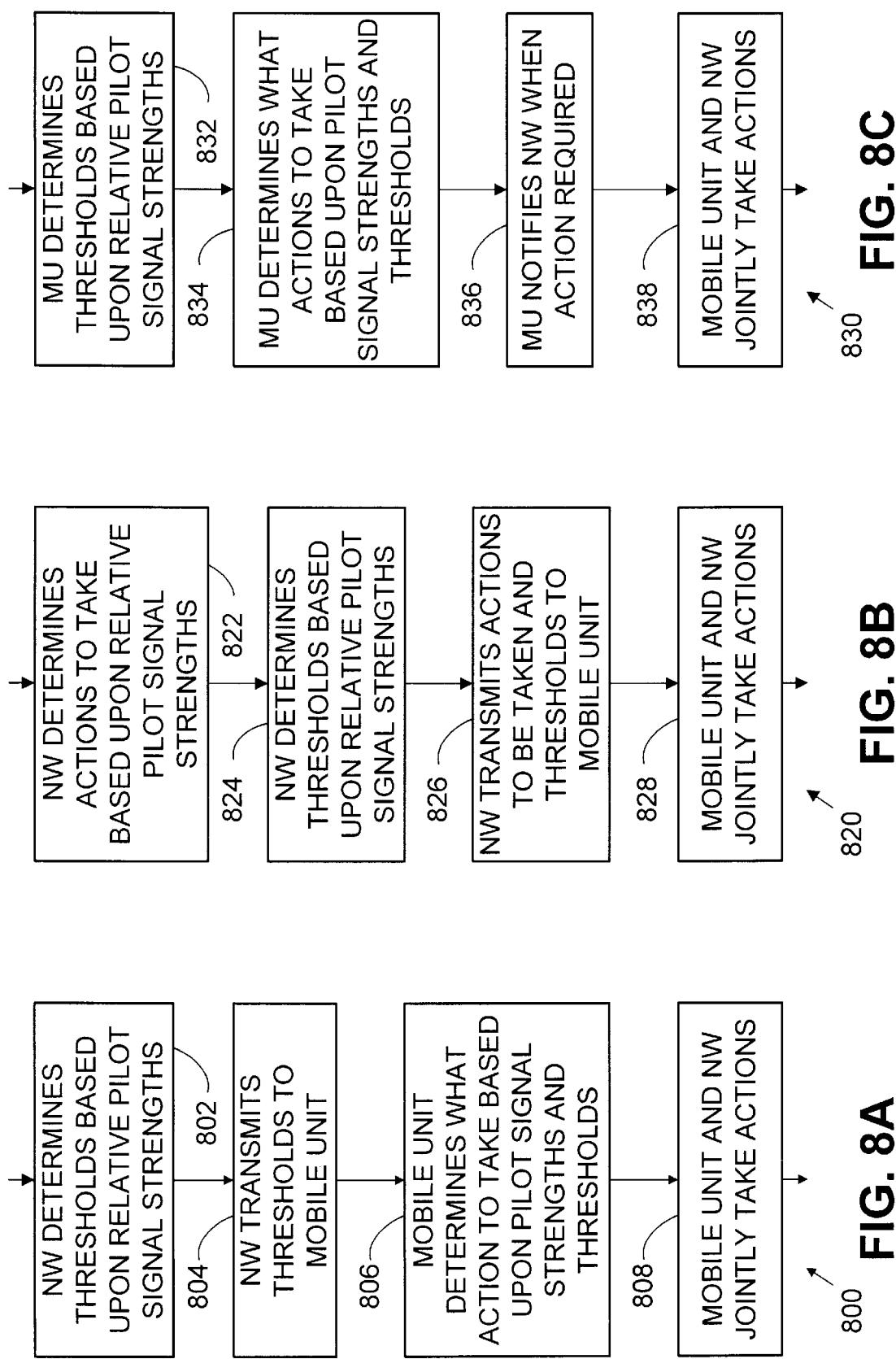
FIGS. 8A through 8C are flow diagrams illustrating actions taken in determining threshold levels and actions to be taken based upon relative pilot signal strengths according to the present invention.

FIGS. 8A through 8C illustrate various operations taken by the network and the mobile unit in determining connections to be made based upon the relative strength of the pilot signals received by the mobile unit. Further, FIGS. 8A through 8C illustrate the generation of thresholds for further action in transmitting PSMMs by the mobile unit based upon strength of the pilot signals.

FIG. 8A illustrates a series of steps 800 corresponding to steps 706 and 708 of FIG. 7. At step 802, the network determines thresholds based upon relative pilot signal strengths. These tb thresholds may correspond to T_ADD, T_DROP, T_TDROP, and T_COMP established in standard IS-95A. However, these thresholds could correspond to other values used by the network or transmitted to the mobile unit for subsequent operations in determining whether to send PSMMs, handoff or other relevant messages. Next, at step 804, the network transmits the thresholds to the mobile unit. Such communication with the mobile unit could be had via an HDM.

Then, at step 806, the mobile unit determines what action to take based upon the pilot signal strengths and the thresholds. Once such determination is made at step 806, the mobile unit and the network jointly take the action at step 808. On the part of the mobile unit, the action may include, for example, moving base stations to the candidate group and/or transmitting a HCM to the network. On the part of the network, the action may include issuing a HDM and allocating resources on the network side for an additional connection.

Steps 820 illustrated in FIG. 8B illustrate an alternative embodiment in making determinations for connections based upon the relative strengths of pilot signals. At step 822, the network determines what action to take based upon pilot signal strengths and thresholds. Such action would typically be based upon the pilot signal strengths previously received from the mobile unit at step 704 of FIG. 7. The immediate action determined to be taken by the network could be to request the mobile unit to add base stations to its active set, or to disconnect connections previously established for base stations that are already in the active set for the mobile unit.

Then, at step 824, the network determines thresholds based upon the pilot signal strengths received from the mobile unit at step 704 of FIG. 7. These thresholds may correspond to T_ADD, T_DROP, T_TDROP, and T_COMP, previously described. However, these thresholds may correspond to other criterion as well. Then, at step 826, the network transmits the actions to be taken to the mobile unit, perhaps in the form of an HDM. The mobile unit and network then jointly take the action in step 828.

Steps 830 illustrated in FIG. 8C show still another embodiment of operation of the wireless communication system according to the present invention. At step 832, the mobile unit determines thresholds based upon pilot signal strengths measured. The mobile unit may use any of the pilot signal strengths it receives. However, based upon particular goals, the thresholds may be determined based upon the pilot signal strengths of base stations contained in the active set and/or the strengths of pilot signals from base stations contained in the candidate set. By establishing thresholds based upon those pilot signals from base stations in the active set, the mobile unit will determine the relative strength of pilot signals received from candidate set base stations for comparison purposes. For example, when the strength of a pilot signal received from a candidate set member is greater than the strength of the strongest active set pilot signal minus some difference, the mobile unit may determine that a PSMM or related message should be set and a connection requested. As compared to prior techniques which looked at only the absolute value compared to static thresholds, such technique would consider the relative strength of connections already established and compare such relative strength of connections to other connections that could be made with candidate set members.

Additional threshold could be established that would compare the relative strength of each active set connection to those connections that could be made with candidate set members. In such case, it may advantageous to move a member of the candidate set to the active set while removing a member of the active set into the candidate set. Such thresholds used in these determinations could be transmitted to the mobile unit from the network. In this fashion, the optimum connections that may be made within the network can be made.

Next, at step 834, the mobile unit determines what action to take based upon the pilot signal strengths and the thresholds. As was previously described, criterion based upon existing signal strengths of active set members serves to parse candidate set members in a more refined fashion and determine which of the candidate set members would more appropriately reside in the active set. Then, after step 844 is complete, the mobile unit takes the determined action to step 846. Such action would typically include sending a PSMM or related message to the network making requests for additional connections and disconnections such that the contents of the active set and the candidate set will be altered.

Figure 9:
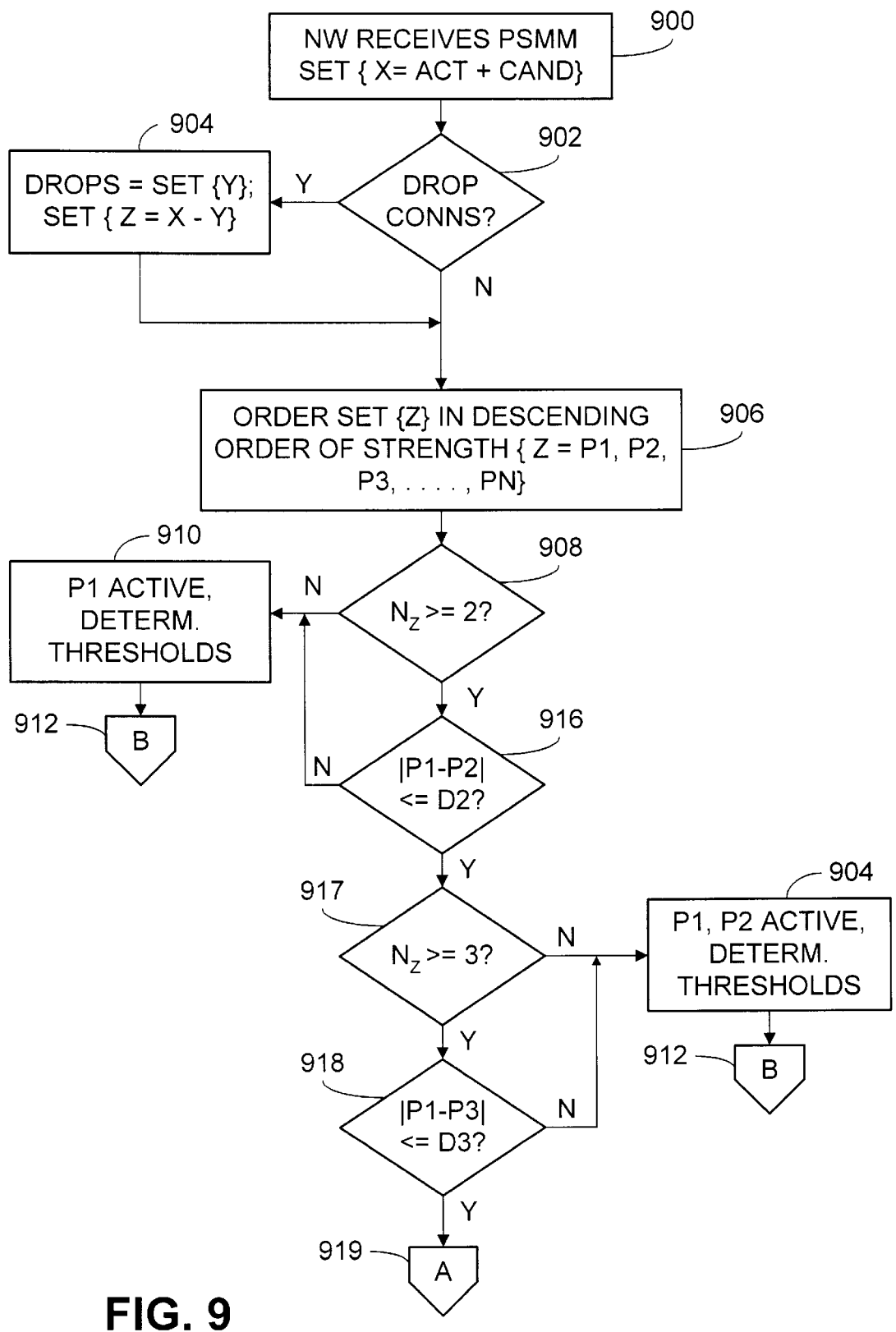
FIGS. 9, 10 and 11 are flow diagrams illustrating a particular operation of a wireless communication system according to the present invention in determining what actions to take based upon the strength of pilot signals contained in a pilot strength measurement message transmitted by a mobile unit.
Figure 10:
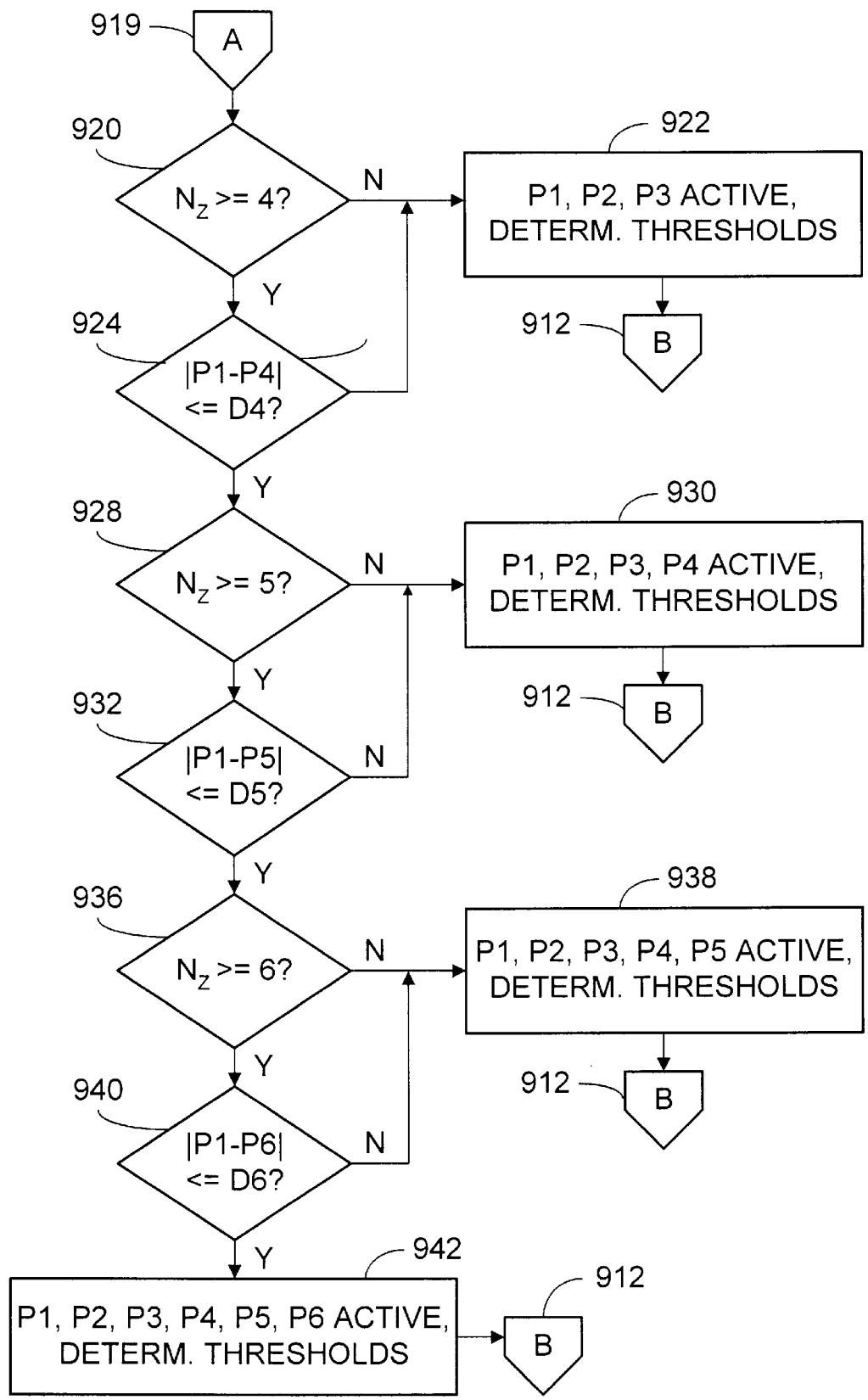
Figure 11:
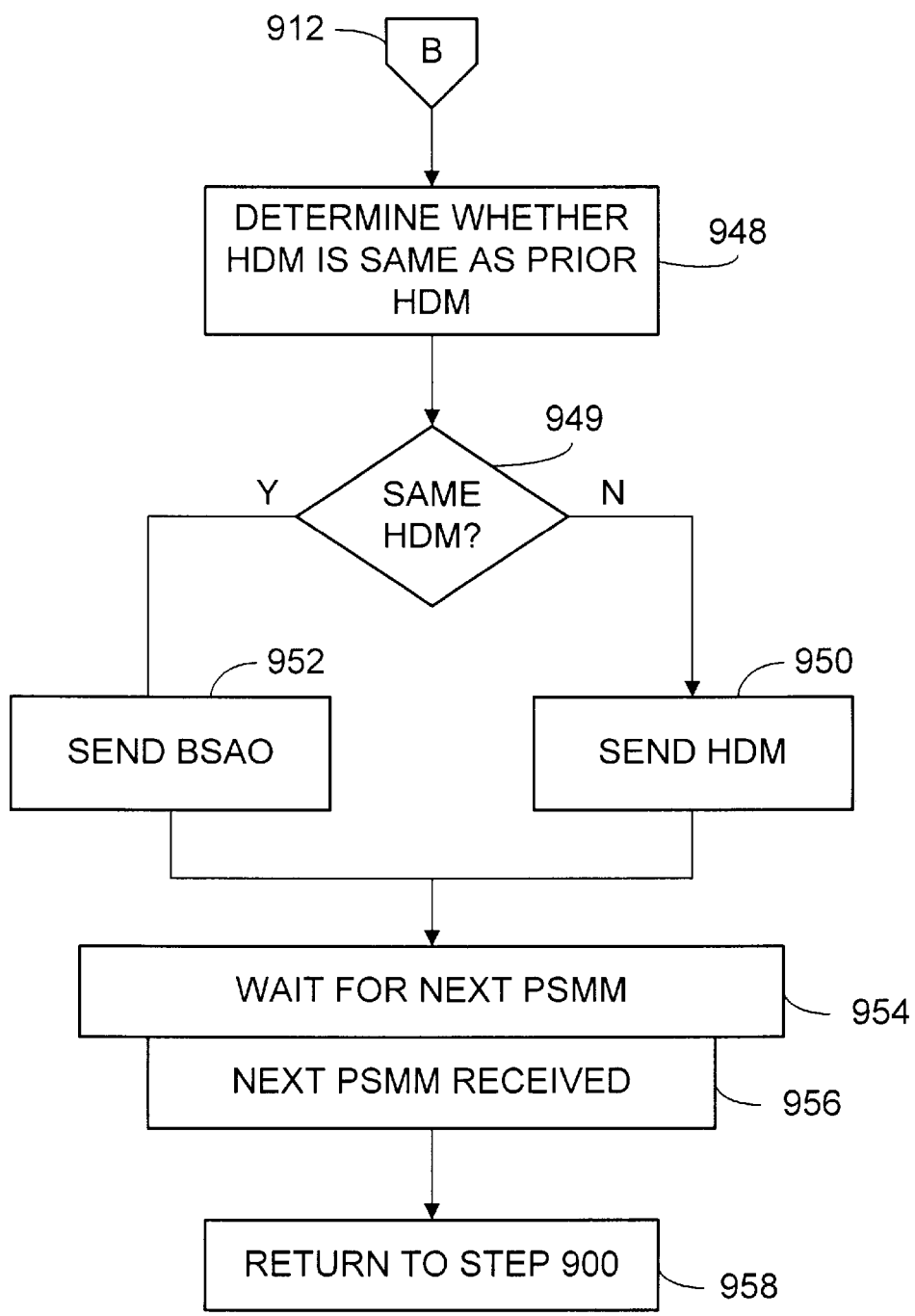

FIGS. 9, 10 and 11 are logic diagrams illustrating a particular implementation of operation of the wireless network of the present invention in which decisions regarding establishing connections between a mobile unit and base stations are made based upon relative strengths of pilot signals received by the mobile unit. Operation commences at step 900 wherein the network receives a PSMM from the mobile unit wherein the set of pilot signal strengths received is equal to the active set contents and the candidate set contents. The set of such pilot signal strengths is referred to as set X.

From step 900 operation proceeds to step 902 wherein the network determines if the mobile unit is requesting that any cells or sectors be dropped. If so, operation proceeds to step 904 wherein such cells or sectors are dropped and the set under consideration is altered to remove such pilot signal strengths. From step 902 wherein the determination is no and from step 904, operation proceeds to step 906. At step 906, the network orders the set of pilot signal strengths in descending order from strongest to weakest. The set having the dropped mobile units removed therefrom is referred to as set Z. Z must have at least one entry or element. If the set X minus the set Y is equal to zero, then the strongest cell/sector is kept in the active set.

From step 906, operation proceeds to step 908 where it is determined whether the number of elements in set Z, $N_z$, is greater than or equal to two. If there is only one pilot signal in the set, a negative determination is made at step 908, operation proceeds to step 910, the base station corresponding to pilot signal P1 is set active, and thresholds (e.g. T_ADD, T_DROP, T_COMP, etc.) are computed or determined (e.g. from a look-up table) based upon the single pilot signal strength or based upon the fact that only a single cell/sector resides in the active set.

Then, from step 910 operation proceeds via off page connector 912 to step 948 of FIG. 11 where it is determined whether the created HDM is exactly the same as the most recently sent HDM. If it is not, a determination of no is made at step 949 and a new HDM is determined and it is sent at step 950. The new HDM includes those thresholds generated at step 910 and are used via subsequent operations by the mobile unit. However, if the HDM created is exactly the same as the most recently sent HDM, a BSAO message is sent at step 952. Then, operation proceeds to step 954 wherein the network waits for the next PSMM. When the next PSMM is received at step 956, operation proceeds again to step 900.

Referring again to FIG. 9, if at step 908 it is determined that the number of elements in the set of pilot signal strengths is greater than, or equal to two, operation proceeds to step 916 wherein the absolute value of the difference in magnitude between the two strongest pilot signals, P1 and P2, is compared to threshold D2. D2 represents a threshold difference to be used between the strongest and next strongest pilot signal. In the particular implementation, the D2 threshold may be set to 100 dB. In such case, if the D2 threshold is 100 dB, it means that the second pilot signal is typically never rejected when compared to the first pilot signal. And connections to both corresponding base stations are typically used. If magnitude of the difference is less than or equal to the threshold D2, operation proceeds to step 917. However, if the magnitude of the difference is not less then or equal to the threshold D2, operation proceeds to step 910.

At step 917 it is determined whether the number of members of the set Z, $N_z$, is greater than or equal to three. If it is not, operation proceeds to step 904 wherein base stations corresponding to pilot signals P1 and P2 are set active and thresholds are determined. However, if it is, operation proceeds to step 918 where it is determined whether the magnitude of the difference in pilot signal strength between signal P1 and P3 is less than or equal to a D3 threshold. In the particular preferred implementation, the D3 threshold is set at 5 dB and the D4, D5, and D6 thresholds are set at 2 dB. In such case, only if relative strengths of less strong pilot signals are close in strength to the strongest pilot signal will the lesser strength pilot signals be placed in the active set.

At step 918 if the magnitude of the difference between the strength of pilot signal P1 and pilot signal P3 is not less than or equal to D3, operation proceeds to step 904. However, if at step 918, if the magnitude of the difference between the strength of pilot signal P1 and pilot signal P3 is less than or equal to D3, operation proceeds via off-page connector to step 920 of FIG. 10. where it is determined whether or not the number of pilot signals $N_z$ is greater than or equal to 4. If it is not, operation proceeds to step 922 wherein pilots P1, P2, and P3 are moved to the active set and thresholds are determined according to such.

If at step 920, the number of pilot signals in the set is greater than or equal to 4, operation proceeds to step 924 where it is determined whether the magnitude of the difference between the strength of P1 and P4 is less than or equal to the D4 threshold. If it is not, operation proceeds to step 922. However, if the magnitude of the difference between pilot signal strengths P1 and P4 is less than or equal to the D4 threshold, operation proceeds to step 928. At step 928, it is determined whether or not the number of pilot signals in the set, $N_z$, is greater than or equal to 5. If it is not, operation proceeds to step 930 wherein pilot signals P1, P2, P3, and P4 are set to the active set and parameters are generated based upon the relative strength of such pilot signals.

If at step 928 it is determined that the number of pilot signals in the set is greater than or equal to 5, operation proceeds to step 932 where it is determined whether the magnitude of the difference in signal strength between pilots P1 and P5 is less than or equal to D5. If not, operation proceeds to step 930. However, if the magnitude of the difference in the signal strengths of P1 and P5 is less than or equal to D5, operation proceeds to step 936.

At step 936 it is determined whether the number of pilot signals $N_z$ is greater than or equal to 6. If it is not, operation proceeds to step 938 wherein pilots P1 through P5 are set to the active set and additional parameters are determined based upon the relative of pilot signals P1 through P5. However, if at step 936 it is determined that the number of pilots is greater than or equal to 6, operation proceeds to step 940. At step 940 it is determined whether or not the magnitude of the difference in strength between pilot signal P1 and pilot signal P6 is less than or equal to the D6 threshold. If the magnitude of the difference is not less than or equal to D6, operation proceeds to step 938. However, if the magnitude is less than the D6 threshold operation proceeds to step 942 wherein base stations corresponding to pilot signals P1 through P6 are moved to the active set. Of course, the principles described could be applied to greater number of pilot signals. A set size of six is described with particular relevance to the IS-95A CDMA standard.

From steps 904, 922, 930, 938 and 942, operation proceeds through off page connector 912 to step 948. Then, if required, a corresponding HDM is sent to the mobile unit to direct the mobile unit's operation.

In view of the above detailed description of the present invention and associated drawings, other modifications and variations will now become apparent to those skilled in the art. It should also be apparent that such other modifications and variations may be effected without departing from the spirit and scope of the present invention as set forth in the claims which follow.

We claim:

1. A wireless communication system that facilitates wireless communication with a mobile unit operating within a respective service area, the wireless communication system comprising:

a mobile switching center;

a plurality of base stations, each base station coupled to the mobile switching center, each base station providing wireless communication and each base station providing a pilot signal that may be received by the wireless mobile unit;

the mobile unit receiving a plurality of pilot signals from the plurality of base stations and measuring the strength of the received pilot signals, the received pilot signals including a strongest pilot signal and at least one weaker pilot signal;

the mobile unit wirelessly connected to at least one of the base stations; and a determination of whether to be connected to a particular base station corresponding to a weaker pilot signal based upon the difference in strength between the strongest pilot signal and the corresponding weaker pilot signal.

2. The wireless communication system of claim 1, the mobile unit evaluating the relative strengths of received pilot signals and requesting a connection to a base station based upon the evaluation.

3. The wireless communication system of claim 2, the mobile unit evaluating the relative strengths of received pilot signals and requesting a release from a connection to a base station based upon the evaluation.

4. The wireless communication system of claim 1, wherein:

the mobile unit notifies the mobile switching center of strengths of received pilot signals; and the mobile switching center determines whether to establish connections between base stations corresponding to the received pilot signals and the mobile unit.

5. The wireless communication system of claim 4, wherein the mobile switching center determines whether to remove a connection between the mobile unit and one of the plurality of base stations based upon strengths of the weaker pilot signals as compared to the strongest pilot signal.

6. The wireless communication system of claim 1, wherein the mobile unit determines whether to notify the mobile switching center of the strengths of received pilot signals based upon strengths of the pilot signals and thresholds.

7. The wireless communication system of claim 1, wherein:

a connect threshold level is determined based upon strengths of pilot signals received by the mobile unit; and the determination of whether to initiate a connection to a particular base station is made based upon a comparison of the strength of a respective pilot signal to the connect threshold.

8. The wireless communication system of claim 1, wherein:

a connect threshold level is determined based upon a number of base stations to which the mobile unit is connected; and the determination of whether to initiate a connection to a particular base station is made based upon a comparison of the strength of a respective pilot signal to the connect threshold.

9. The wireless communication system of claim 1, wherein:

a connect threshold level is determined by the mobile unit based upon strengths of pilot signals received by the mobile unit; and the determination of whether to initiate a connection to a particular base station is made based upon a comparison of the strength of a respective pilot signal to the connect threshold.

10. The wireless communication system of claim 9, wherein:

the connect threshold level is determined based upon relative strengths of pilot signals received by the mobile unit from at least one connected base station.

11. The wireless communication system of claim 1, wherein:

a drop threshold level is determined based upon strengths of pilot signals received by the mobile unit; and a determination of whether to initiate a drop of a connection with a particular base station is made based upon a comparison of the strength of a respective pilot signal to the drop threshold.

12. The wireless communication system of claim 11, wherein:

the drop threshold level is determined for a particular connected base station based upon strengths of pilot signals received by the mobile unit from at least some of the connected base stations.

13. The wireless communication system of claim 1, wherein:

each of the base stations includes a plurality of sectors, wherein the base station may communicate with mobile units in more than one of the plurality of sectors and wherein the base station provides a pilot signal for each sector that may be received by the wireless mobile unit;

the mobile unit receiving a plurality of pilot signals from the plurality of sectors of the base station and measuring the strength of the received pilot signals, the received pilot signals including a strongest pilot signal and at least one weaker pilot signal;

the mobile unit connected to a particular sector of the base station corresponding to the strongest pilot signal; and a determination of whether to be connected to a particular sector of the base station corresponding to a weaker pilot signal based upon the difference in strength between the strongest pilot signal and the corresponding weaker pilot signal.

14. A wireless communication system that facilitates wireless communication with a mobile unit operating within a respective service area, the wireless communication system comprising:

a base station that provides wireless communication within a plurality of sectors that form the service area, wherein the base station may communicate with the mobile unit in more than one of the plurality of sectors and wherein the base station provides a pilot signal for each sector that may be received by the wireless mobile unit;

the mobile unit receiving a plurality of pilot signals from the plurality of sectors of the base station and measuring the strength of the received pilot signals, the received pilot signals including a strongest pilot signal and a plurality of weaker pilot signals;

the mobile unit wirelessly connected to at least one of the sectors of the base station; and a determination of whether to be connected to a particular sector of the base station corresponding to a weaker pilot signal based upon the difference in strength between the strongest pilot signal and the corresponding weaker pilot signal.

15. The wireless communication system of claim 14, the mobile unit evaluating the relative strengths of received pilot signals and requesting a connection to a sector of the base station based upon the evaluation.

16. The wireless communication system of claim 14, the mobile unit evaluating the relative strengths of received pilot signals and requesting a release from a connection to a sector of the base station based upon the evaluation.

17. The wireless communication system of claim 14, wherein:

the mobile unit notifies the base station of strengths of received pilot signals; and the base station determines whether to establish a connection between the mobile unit and one of the of sectors of the base stations.

18. The wireless communication system of claim 14, wherein the mobile unit notifies the base station of strengths of received pilot signals; and the base station determines whether to drop a connection between the mobile unit and one of the sectors of the base station.

19. The wireless communication system of claim 14, wherein the mobile unit determines whether to notify the base station of the strengths of received pilot signals based upon strengths of the pilot signals received from the base station and determined thresholds.

20. The wireless communication system of claim 14, wherein:

a connect threshold level is determined based upon relative strengths of pilot signals received by the mobile unit; and the determination of whether to initiate a connection to a particular base station is made based upon a comparison of the strength of a respective pilot signal to the connect threshold.

21. The wireless communication system of claim 20, wherein:

the connect threshold level is determined based upon relative strengths of pilot signals received by the mobile unit from connected sectors of the base stations.

22. The wireless communication system of claim 14, wherein:

a drop threshold level is determined based upon relative strengths of pilot signals received by the mobile unit; and a determination of whether to initiate a drop of a connection with a particular sector of the base station is made based upon a comparison of the strength of a respective pilot signal to the drop threshold.

23. The wireless communication system of claim 22, wherein:

the drop threshold level is determined for a particular connected sector of the base station based upon relative strengths of a strongest pilot signal and weaker pilot signals received by the mobile unit corresponding to at least one of the connected sectors of the base stations.

24. A method of operating a wireless communication system that facilitates wireless communication with a mobile unit operating within a respective service area, the method comprising:

broadcasting a plurality of pilot signals, each of pilot signals corresponding to a respective one of a plurality of base stations;

receiving, by the mobile unit, a plurality of received pilot signals;

measuring strengths of the received pilot signals, the received pilot signals including a strongest pilot signal and at least one weaker pilot signal; and determining whether to establish a connection between the mobile unit and a base station corresponding to a weaker pilot signal based upon the difference in strength between the strongest pilot signal and the corresponding weaker pilot signal.

25. The method of claim 24, further comprising:

evaluating the relative strengths of received pilot signals; and requesting a connection to a base station based upon the evaluation.

26. The method of claim 25, further comprising:

requesting a release from a connection to a base station based upon the evaluation.

27. The method of claim 24, further comprising:

determining whether to transmit the strengths of received pilot signals to one of the base stations based upon relative strengths of the pilot signals received from the base station and determined thresholds.

28. The method of claim 24, further comprising:

determining a connect threshold based upon relative strengths of pilot signals received by the mobile unit; and initiating a connection to a particular base station based upon a comparison of the strength of a respective pilot signal to the connect threshold.

29. The method of claim 28, further comprising:

determining the connect threshold based upon relative strengths of pilot signals received by the mobile unit from connected base stations.

30. The method of claim 24, further comprising:

determining a drop threshold based upon relative strengths of pilot signals received by the mobile unit; and initiating a drop of a connection with a particular base station based upon a comparison of the strength of a respective pilot signal to the drop threshold.

31. The method of claim 24, further comprising:

notifying the base station of strengths of the received pilot signals; and determining by the base station whether to establish a connection between the mobile unit and one of the base stations based upon the difference in strength between the strongest pilot signal and a corresponding weaker pilot signal.

32. The method of claim 31, further comprising:

determining by the base station whether to drop a connection between the mobile unit and one of the base stations based upon relative strengths of the pilot signals.

33. A method of operating a wireless communication system that facilitates wireless communication with a mobile unit operating within a respective service area, the method comprising:

broadcasting a plurality of pilot signals, each of pilot signals corresponding to a respective one of a plurality sectors provided by a base station;

receiving, by the mobile unit, a plurality of received pilot signals;

measuring respective strengths of the received pilot signals, the received pilot signals including a strongest pilot signal and a plurality of weaker pilot signals; and determining whether to establish a connection between the mobile unit and a sector of the base station that corresponds to a weaker pilot signal based upon the difference in strength between the strongest pilot signal and the corresponding weaker pilot signal.

34. The method of claim 33, further comprising:

evaluating the relative strengths of received pilot signals; and requesting a connection to a sector based upon the evaluation.

35. The method of claim 34, further comprising:

requesting a release from a connection to a sector based upon the evaluation.

36. The method of claim 33, further comprising:

determining whether to transmit the relative strengths of received pilot signals to the base station based upon strengths of the pilot signals and determined thresholds.

37. The method of claim 33, further comprising:

determining a connect threshold based upon relative strengths of pilot signals received by the mobile unit; and initiating a connection to a particular sector based upon a comparison of the strength of a respective pilot signal to the connect threshold.

38. The method of claim 37, further comprising:

determining the connect threshold based upon relative strengths of pilot signals received by the mobile unit corresponding to at least some connected sectors.

39. The method of claim 33, further comprising:

determining a drop threshold based upon relative strengths of pilot signals received by the mobile unit; and initiating a drop of a connection with a particular sector based upon a comparison of the strength of a respective pilot signal to the drop threshold.

40. The method of claim 33, further comprising:

notifying the base station of strengths of received pilot signals; and determining by the base station whether to establish a connection between the mobile unit and one of the sectors of the base station based the difference in strength between the strongest pilot signal and the corresponding weaker pilot signal.

41. The method of claim 40, further comprising:

determining by the base station whether to drop a connection between the mobile unit and one of the sectors of the base station based upon relative strengths of the pilot signals.

* * * * *